United States Patent Office 3,435,294
Patented Mar. 25, 1969

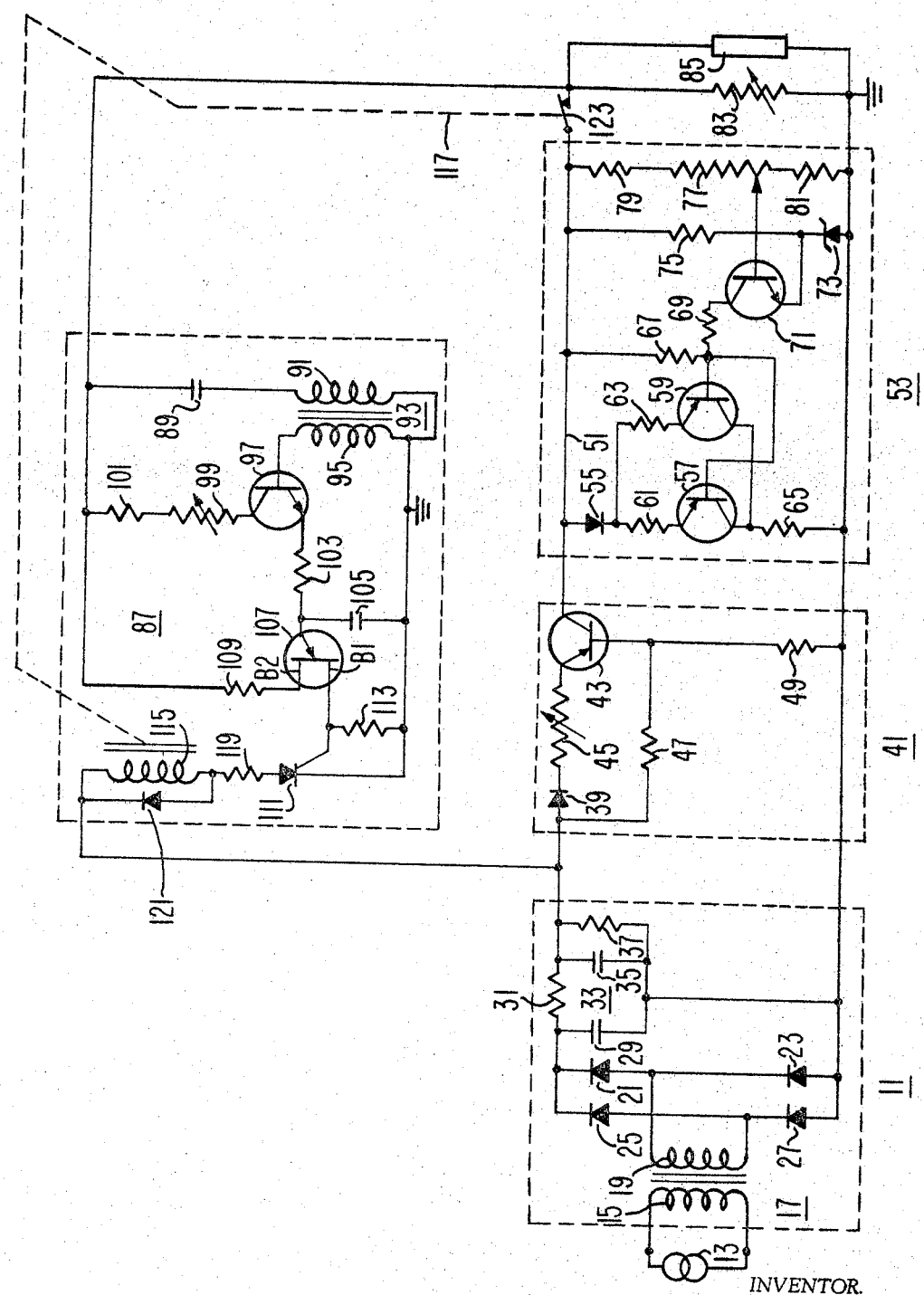

3,435,294
VOLTAGE REGULATOR CIRCUIT HAVING CONSTANT INPUT IMPEDANCE AND MEANS FOR PROTECTING AGAINST LOAD VOLTAGE RIPPLE
Robert H. Lemma, Garden City, Mich., assignor to Burroughs Corporation, Detroit, Mich., a corporation of Michigan
Filed Jan. 18, 1966, Ser. No. 521,293
Int. Cl. H02h 3/28
U.S. Cl. 317—31                                           4 Claims

ABSTRACT OF THE DISCLOSURE

A voltage regulator including a variable impedance shunt regulator and a series decoupling circuit, both of which are connected between a power supply and a load. The shunt regulator compensates for a changing load impedance as long as the latter is above a predetermined minimum value. When the load impedance falls below this minimum value, the series decoupling circuit inserts a high impedance between the power supply and the load to effectively isolate them from one another. The impedance reflected back to the power supply remains constant. A fail-safe switching device is provided for disconnecting the load from the power supply if the ripple component of the load voltage exceeds a predetermined value.

---

This invention relates generally to circuits for coupling a power supply to a load, and more particularly to constant input impedance circuits which couple an unregulated power supply to a variable load and which supply a regulated voltage to the load over a designated range.

Sources of regulated DC voltage are indispensible components of almost all electronic systems. Both radio and computer circuits, for instance, require at least one, and usually several, regulated power supplies.

In any of these systems, if the supply voltage becomes too high, the output of circuits in the system is likely to saturate other circuits in the system to which they are coupled. This can cause loss of signal information, especially in radio circuits. It is also well known that sensitive electronic components are easily damaged or destroyed by the application to them, even for a short time, of voltage beyond their ratings. If the supply voltage becomes too low, losses of output power of circuits in the system may result, leading to improper operation of the system.

The bias voltages for a system are usually taken from the supply voltages by some voltage divider or other suitable step-down method. Any significant excursion of the supply voltage from the desired value can cause non-linear electronic devices, such as vacuum tubes, diodes, and transistors, to operate in undesirable portions of their characteristics.

The output voltage of an unregulated power supply varies with changes in the impedance of the load. For high impedance loads the output voltage is significantly higher than it would be for a lower impedance load. Thus, it is usually undesirable to use an unregulated power supply in certain electronic circuits in which the impedance varies with changes in operating conditions.

These problems are usually remedied by the use of a regulating circuit which couples the output of the unregulated supply to a load and supplies a lower, but regulated, voltage at the output terminal. It is often the case, however, that variations in the unregulated supply voltage, caused by changes in the load impedance coupled back through the regulating circuit, are too large even for the regulating circuit to handle.

It is also important in all circuits to protect the unregulated power supply from overloads due to the shorting out or deterioration of components in the load circuits. If the load circuit is operating properly its impedance varies over only an expected limited range, so that it is necessary to supply the regulated voltage only over this range. When the load impedance falls below this range it draws more current from the unregulated supply. Power supplies which are not protected from these conditions may easily be damaged or destroyed by failures in the load.

It is therefore an object of my invention to provide a novel circuit which regulates the output of an unregulated voltage supply.

Another object of my invention is to protect an unregulated power supply from overloads caused by the shorting out of components in the load circuit.

A further and more specific object of my invention is to provide a circuit for coupling an unregulated voltage supply to a variable load, which circuit presents a constant input impedance to the unregulated supply, regardless of the value of the load impedance, and supplies a regulated output voltage to the load over a designated range of load impedance.

In carrying out these and other objects of my invention I provide a regulator-decoupler circuit for coupling the output of an unregulated power supply to a load. The circuit comprises a first variable impedance shunting the load for holding the load voltage constant over a desired range by keeping constant the impedance of the parallel combination of load and variable impedance as long as the load impedance is above a minimum value. The circuit also includes a second variable impedance connected in series between the unregulated supply and the load for increasing its impedance to hold constant the input impedance seen by the unregulated supply when the load impedance falls below the minimum value, and relay means energizable from the unregulated supply for disconnecting the load from the coupling circuit if the load ripple voltage becomes too high.

Various other objects, advantages, and features of my invention will become more fully apparent from the following specification with its appended claims and the single accompanying drawing, which is a schematic drawing of a circuit embodying my invention.

My invention can best be understood by referring to the following detailed description of the illustrated embodiment.

Referring to the drawing, unregulated power supply 11 receives its input power from the AC line source 13, which is connected to the primary winding 15 of transformer 17. The secondary winding 19 of transformer 17 is connected to a full wave rectifier made up of diodes 21, 23, 25 and 27. One terminal of secondary winding 19 is connected to the anode of diode 21 and the cathode of diode 23, and the other terminal is connected to the anode of diode 25 and the cathode of diode 27. The anodes of diodes 27 and 23 are grounded, and the cathodes of diodes 21 and 25 are connected to the input of low pass filter 33 at the junction of capacitor 29 and resistor 31. The other end of capacitor 29 is grounded, and the other end of resistor 31 is connected to capacitor 35 and resistor 37. The other ends of capacitor 35 and resistor 37 are grounded.

The output of filter 33 of unregulated supply 11 is taken from the junction of resistor 31 and resistor 37 and is connected to the anode of diode 39 of series decoupler 41. The cathode of diode 39 is connected to the emitter of the series connected PNP transistor 43 through resistor 45. The base of transistor 43 is connected to resistors 47 and 49. The other ends of resistors 47 and 49 are connected to the anode of diode 39 and to ground, respectively. The collector of transistor 43 is connected to the output line 51.

Shunt regulator 53 is connected between output line 51 and ground. The anode of diode 55 of shunt regulator 53 is connected to output line 51. The cathode of diode 55 is connected to the emitters of parallel connected PNP regulator transistors 57 and 59 through resistors 61 and 63, respectively. The collectors of transistors 57 and 59 are connected to ground through resistor 65. The bases of transistors 57 and 59 are connected to the junction of resistors 67 and 69. The other ends of resistors 67 and 69 are connected to output line 51 and the collector of NPN driver transistor 71 of shunt regulator 53, respectively. The emitter of transistor 71 is connected to the cathode of voltage reference Zener diode 73. The cathode of Zener diode 73 is also connected to output line 51 through resistor 75. The anode of Zener diode 73 is grounded. The base of transistor 71 is connected to the wiper of potentiometer 77. One end terminal of potentiometer 77 is connected to the output line 51 through resistor 79. The other end terminal is connected to ground through resistor 81.

Load 85 is connected between output line 51 and ground. Variable resistor 83 is also connected between output line 51 and ground to limit the rise in voltage which occurs when load 85 is removed or becomes open-circuited.

Fail-safe circuit 87 is provided to disconnect the load 85 and variable resistor 83 from the unregulated power supply 11 if the output ripple voltage should become too high. Capacitor 89 is connected in series between output line 51 and the primary winding 91 of voltage sensing transformer 93. The other terminal of the primary winding 91 is grounded. Secondary winding 95 of voltage sensing transformer 93 is connected between ground and the base of NPN transistor 97. The collector of transistor 97 is connected to variable resistor 99, the other end of which is connected to the output line 51 through resistor 101. The emitter of transistor 97 is connected through resistor 103 to the junction of capacitor 105 and the emitter of unijunction transistor 107. The other side of capacitor 105 is grounded. Base 2 of unijunction transistor 107 is connected to the output line 51 through resistor 109. Base 1 of unijunction transistor 107 is connected to the trigger input of silicon controlled rectifier 111. Resistor 113 is connected between base 1 of unijunction transistor 107 and ground. Coil 115 of relay 117 of fail-safe circuit 87 is connected between the output of unregulated voltage supply 11 and resistor 119, the other end of which is connected to the anode of silicon controlled rectifier 111. The cathode of silicon controlled rectifier 111 is grounded. Diode 121 is connected across the terminals of coil 115 with its cathode connected to the output of unregulated voltage supply 11 and its anode connected to resistor 119. Normally closed relay contacts 123 of relay 117 are connected in series with output line 51 between shunt regulator 53 and resistor 83 and load 85.

In operation, the AC input power 13 is fed through transformer 17 and rectified by the full wave rectifier, with diodes 21 and 27 conducting on the positive half-cycle of the input wave and diodes 25 and 23 conducting on the negative half-cycle. Next, the rectified waveform is smoothed out by low pass filter 33, the AC components of the rectified wave being shunted to ground by capacitors 29 and 35. The filtered wave is then fed into series decoupler 41. The voltage divider made up of resistors 47 and 49 holds the base of transistor 43 at a lower potential than the emitter, thereby biasing the transistor 43 on. Variable resistor 45 is set so that under normal operating conditions the voltage drop across diode 39 and variable resistor 45 is such that transistor 43 is just over the threshold of saturation. The collector of PNP transistor 43 is attached to output line 51.

The output of the series decoupler circuit 41 is next regulated by shunt regulator 53. When the load impedance 85 drops, the voltage across it also tends to drop, thereby tending to decrease the voltage across the series voltage divider made up of resistors 79 and 81 and potentiometer 77. This decreases the voltage at the base of the NPN transistor 71. The voltage at the emitter of transistor 71 is held constant by reference diode 73 and resistor 75, which are connected between the output line 51 and ground. Therefore, when the voltage at the base of transistor 71 drops, transistor 71 becomes less conductive, and less current flows through resistors 67 and 69, causing the voltage at the bases of parallel connected PNP transistors 57 and 59 to increase. This increase in voltage decreases the amount of the forward biasing of their base to emitter junctions and makes them less conductive. A portion of the current which had been flowing through the shunt regulator 53 is thereby diverted to the load 85, so that more current flows through the load 85 and the load voltage is retained at the proper regulated level.

If the load impedance increases, the load voltage tends to increase, thereby increasing the voltage across the voltage divider made up of resistors 79 and 81 and potentiometer 77. This in turn makes transistor 71 more conductive and decreases the voltage at the bases of transistors 57 and 59. Transistors 57 and 59 therefore become more conductive so that less current flows to the load 85, and the load voltage remains at the regulated value.

The operation of shunt regulator 53 is, in effect, to keep the impedance of the parallel combination of the load 85 and shunt regulator 53 constant, regardless of changes in the load impedance, thereby presenting a constant impedance to the series decoupler 41 and the unregulated voltage supply 11.

If the load impedance drops below a predetermined minimum value, the shunt regulator 53 is not able to supply enough current to keep the output voltage constant, and the load attempts to draw more from the unregulated supply 11 through the series decoupler circuit 41. This tends to increase the voltage drop across variable resistor 45. However, any increase in the voltage drop across variable resistor 45 decreases the amount of forward bias at the base to emitter junction of transistor 43 and increases its impedance, thereby, in effect, decoupling the additional current demand of the load 85 from the unregulated supply 11 so that it does not affect the current or voltage of the supply 11. Therefore, the impedance of the series decoupler 41 connected in series with the parallel combination of the shunt regulator 53 and the load 85 is variable and serves to hold constant the input impedance seen by the unregulated power supply 11. No attempt is made to maintain the load voltage at the regulated level when the load impedance falls below the minimum level.

The AC component of the ripple voltage on the output line 51 is sensed by the primary winding 91 of transformer 93 of fail-safe circuit 87. Capacitor 89 prevents any DC current from flowing in the primary winding 91. Transformer 93 steps up the ripple voltage by a 1:3 ratio. The secondary winding 95 is connected to the base of transistor 97 so that if the ripple becomes too high, it turns on NPN transistor 97 for portions of the ripple voltage cycle. The turning on of transistor 97 charges the capacitor 105 through resistor 103. When the charge on capacitor 105 becomes high enough, it triggers unijunction transistor 107, which causes current to flow in resistor 113. This couples a positive voltage pulse to the terminal of silicon controlled rectifier 111, and turns it on. When the silicon controlled rectifier 111 turns on, it activates relay 117 and opens the relay contacts 123, which disconnects the load and variable resistor 83 from the output line 51. Capacitor 105 and resistor 103 in the fail-safe circuit 87 act as a timing circuit and prevent the unijunction transistor 107 from being triggered by a single random noise pulse on the output line 51.

It is to be understood that the foregoing description is by illustration only, and as will be obvious to one skilled in the art, my invention may be practiced in other embodiments without departing from the spirit and scope of my invention. My invention may be used in any type of power supply where it is desired to present a constant impedance to the power supply, regardless of any changes in the load impedance.

I claim:

1. A regulator-decoupler circuit for coupling a power supply to a variable load and for supplying regulated current to said load as long as the impedance of said load is above a predetermined minimum value comprising
    variable impedance shunt regulator means connected in parallel with said load for holding substantially constant the combined parallel impedances of said load and said variable impedance shunt regulator means as long as the load impedance is above said minimum value,
    variable decoupler means connected between said variable impedance shunt regulator means and said power supply for holding substantially constant the impedance seen by said power supply when said load impedance falls below said minimum value, said variable decoupler means including
        a transistor connected in series between said shunt regulator and said power supply,
        a circuit for biasing said transistor just beyond its threshold of saturation, and
        resistive means for decreasing the amount of forward bias on said series-connected transistor in response to any increase in the current through said series-connected transistor for holding said current substantially constant, and
    fail-safe means for decoupling the load from the power supply if the ripple component of the voltage supplied to the load exceeds a predetermined maximum value, said fail safe means including
        transformer means for sensing the ripple voltage level at the load,
        electroresponsive switching means,
        delay means connecting the transformer means to said electroresponsive switching means and operable to trigger said switching means if said ripple voltage level exceeds said maximum value and to prevent said switching means from being triggered by a random noise pulse, and
        relay means activated by the triggering of said switching means for disconnecting said load from said power supply upon the activation of said relay.

2. The circuit of claim 1, wherein the electroresponsive switching means of said fail-safe means is a unijunction transistor.

3. The circuit of claim 1, wherein said relay means of said fail-safe means includes a pair of normally closed contacts connected between said variable impedance shunt regulator and said load.

4. An electrical regulator-decoupler circuit for coupling a power supply to a variable load and for supplying regulated current to said load as long as the impedance of said load is above a predetermined minimum value comprising:
    variable impedance shunt regulator means connected in parallel with said load for holding substantially constant the combined parallel impedances of said load and said variable impedance shunt regulator means as long as the load impedance is above said minimum value,
    variable decoupler means connected between said variable impedance shunt regulator means and said power supply for holding substantially constant the impedance seen by said power supply when said load impedance falls below said minimum value, and
    fail-safe means for decoupling the load from the power supply if the ripple component of the voltage supplied to the load exceeds a predetermined maximum value, said fail-safe means including,
        transformer means for sensing the ripple voltage level at the load,
        electroresponsive switching means,
        delay means connecting the transformer means to said electroresponsive switching means and operable to trigger said switching means if said ripple voltage level exceeds said maximum value and to prevent said switching means from being triggered by a random noise pulse, and
        relay means activated by the triggering of said switching means for disconnecting said load from said power supply upon the activation of said relay.

References Cited

UNITED STATES PATENTS

| | | |
|---|---|---|
| 3,049,632 | 8/1962 | Staples. |
| 3,106,645 | 10/1963 | Kaufman. |
| 3,124,697 | 3/1964 | Trenchard. |
| 3,124,698 | 3/1964 | Semmer et al. |
| 3,229,164 | 1/1966 | McCartney et al. _____ 317—22 |
| 3,339,114 | 8/1967 | Kelley et al. |

JOHN F. COUCH, *Primary Examiner.*

A. D. PELLINEN, *Assistant Examiner.*

U.S. Cl. X.R.

317—33; 323—22